US007669241B2

(12) United States Patent
Ganguly et al.

(10) Patent No.: US 7,669,241 B2
(45) Date of Patent: Feb. 23, 2010

(54) STREAMING ALGORITHMS FOR ROBUST, REAL-TIME DETECTION OF DDOS ATTACKS

(75) Inventors: Sumit Ganguly, Bhopal (IN); Minos Garofalakis, Morristown, NJ (US); Rajeev Rastogi, New Providence, NJ (US); Krishan Sabnani, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 558 days.

(21) Appl. No.: 10/954,901

(22) Filed: Sep. 30, 2004

(65) Prior Publication Data

US 2006/0075489 A1 Apr. 6, 2006

(51) Int. Cl.
*G06F 12/14* (2006.01)
(52) U.S. Cl. ....................................................... 726/22
(58) Field of Classification Search .................... 726/22
See application file for complete search history.

(56) References Cited

U.S. PATENT DOCUMENTS

| | | | | |
|---|---|---|---|---|
| 5,197,002 A | * | 3/1993 | Spencer ........................ | 705/34 |
| 5,852,822 A | * | 12/1998 | Srinivasan et al. .............. | 707/4 |
| 6,138,114 A | * | 10/2000 | Horowitz ........................ | 707/2 |
| 7,464,410 B1 | * | 12/2008 | Halasz et al. .................. | 726/23 |
| 2003/0002436 A1 | * | 1/2003 | Anderson et al. ............ | 370/218 |
| 2003/0018688 A1 | * | 1/2003 | Sternin ........................ | 709/103 |

OTHER PUBLICATIONS

S. Ganguly, et al. "Processing Data-Stream Join Aggregates Using Skimmed Sketches", published online in Feb. 2004, and as pp. 569-586 in "Lecture Notes in Computer Science", vol. 2992/2004, "Advanced in Database Technology—EDBT 2004: 9th International Conference on Extending Database Technology, Heraklion, Crete, Greece, Mar. 14-18, 2004", edited by Elisa Bertino et al., published by Springer-Verlang, Heidelberg, German, 2004.

(Continued)

*Primary Examiner*—Nasser G Moazzami
*Assistant Examiner*—Michael S McNally
(74) *Attorney, Agent, or Firm*—Carlson, Gaskey & Olds

(57) ABSTRACT

A distinct-count estimate is obtained in a guaranteed small footprint using a two level hash, distinct count sketch. A first hash fills the first-level hash buckets with an exponentially decreasing number of data-elements. These are then uniformly hashed to an array of second-level-hash tables, and have an associated total-element counter and bit-location counters. These counters are used to identify singletons and so provide a distinct-sample and a distinct-count. An estimate of the total distinct-count is obtained by dividing by the distinct-count by the probability of mapping a data-element to that bucket. An estimate of the total distinct-source frequencies of destination address can be found in a similar fashion. By further associating the distinct-count sketch with a list of singletons, a total singleton count and a heap containing the destination addresses ordered by their distinct-source frequencies, a tracking distinct-count sketch may be formed that has considerably improved query time.

13 Claims, 5 Drawing Sheets

OTHER PUBLICATIONS

"Sketch-Base Multi-Query Processing Over Data Streams" by A. Dobra et al., in "lecture Notes in Compute Science", vol. 2992/2004, "Advanced in Database Technology—EDBT 2004; 9th International Conference on Extending Database Technology, Heraklion, Crete, Greece, Mar. 14-18, 2004", edited by Bertino et al., pp. 551-568, published by Springer-Verlag, Heidelberg 2004.

S. Ganguly et al entitled "Processing Set Expressions over Continuous Update Streams", published in the Proceedings of the 2003 ACM SIGMOD International Conference on Management of Data, San Diego, California, USA, Jun. 9-12, 2003 edited by A. Halevy et al. and published by Association for Computing Machinery (ACM), New York, NY 2003, ISBN 1-58113-634-X, pp. 265-276 (2003).

S. Ganguly et al, entitled "Tracking set-expression Cardinalities over Continuous Update Stream", published in the VLDB Journal: The International Journal on Very Large Databases, vol. 13, No. 4, Dec. 2004 pp. 354-369, published by Springer-Verlag, Heidelberg, 2004.

* cited by examiner

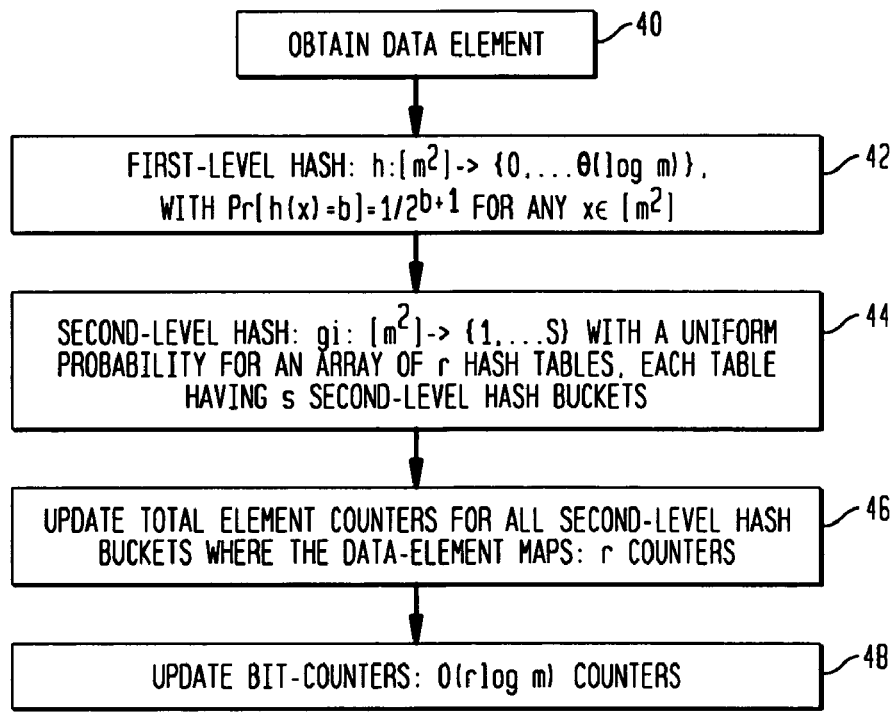
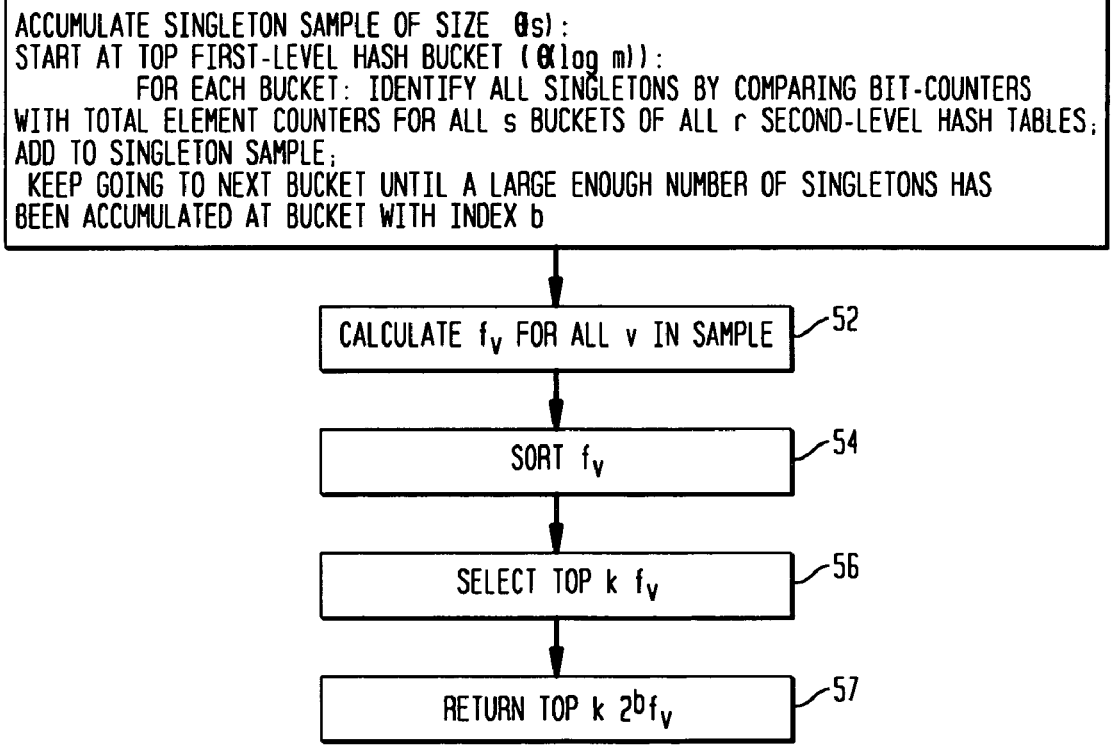

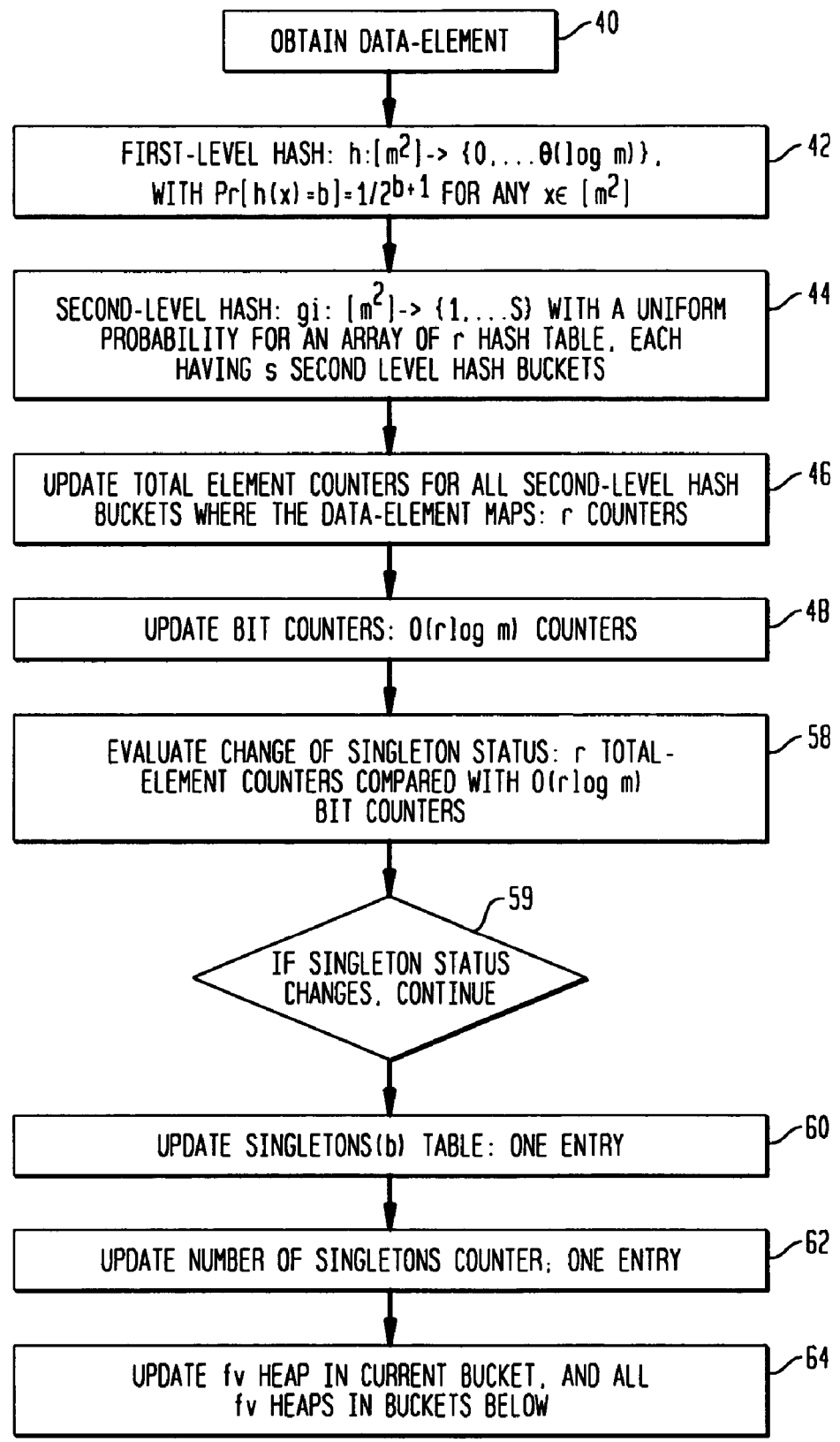

US 7,669,241 B2

STREAMING ALGORITHMS FOR ROBUST, REAL-TIME DETECTION OF DDOS ATTACKS

FIELD OF THE INVENTION

The present invention relates to methods and systems for detecting distributed denial of service (DDoS) attacks, and particularly to methods and systems for detecting DDoS attacks on communications networks.

BACKGROUND OF THE INVENTION

Detecting a distributed denial-of-service (DDoS) attack on a network, particularly a packet flooding DDoS attack such as a well known TCP-SYN flood attack, is a problem that requires monitoring a very high volume of streaming data having both insertion and deletion events, using a guaranteed small foot print, i.e. a guaranteed small amount of computer memory and processing power.

Any system connected to the Internet and providing Transmission Control Protocol (TCP) based network services (such as a Web server, file transfer protocol (FTP) server, or mail server) is potentially vulnerable to a TCP-SYN flood attack, because of the manner in which a TCP connection is established. When a client device attempts to establish a TCP connection with a server, an initial, pre-determined sequence of messages are exchanged. The client first sends a synch (SYN) message containing its internet protocol (IP) address to the server. The server acknowledges this with a synch acknowledged (SYN-ACK) message and the client responds with an acknowledge (ACK) message to complete the connection.

The potential for abuse arises at the point where the server system has sent a SYN-ACK message back to the client but has not yet received the ACK message, i.e., a half-open connection has been established. The server is vulnerable because the data structure for storing information about each half-open, pending connection has a finite size, and the server has a limited area in which to store these data structures. By creating a large number of half-open connections, the memory allocated for storing this information can be completely filled, at which point the system can no longer process new connections. In some operating systems, when these data structures overflow the memory allocated to them, system data is overwritten and the server crashes.

Creating half-open connections is easily accomplished by IP spoofing, i.e., by making attempts to establish IP connections that look as if they are from a legitimate source, but actually have randomly-chosen, fake IP addresses. As there are no client machines sending these attempts to connect, the connections cannot be completed, resulting in half-open connections that persist until the server removes them. The attacking machine (or machines) attempts to fill, and preferably overflow, the server memory allocated to monitoring pending connections by sending enough spoofed connection attempts. Although there is usually a timeout associated with a half-open connection so that it will eventually expire, the attacking machines may prevail by simply sending IP-spoofed connection requests faster than the victim system expires them.

The impact of successful DDoS attacks can be severe and widespread. The possible damage includes Service-Level-Agreement (SLA) violations, frustrated customers, and cumulative loss of business that can in some cases amount to many millions of dollars.

To prevent such attacks, they have to be detected in real-time so that appropriate action can be taken to mitigate the consequences of the attack, such as diverting all traffic to those sites under attack through specially designed filters such as the SureArmour™ filters supplied by Riverhead Technology of Cupertino, Calif.

The problem of effective and timely detection of such attacks on large internet service providers' (ISP) networks requires algorithms that can operate in real-time in a data-streaming fashion to obtain accurate estimates of destination machines having a large number of distinct half-open connections.

Previous attempts to investigate DDoS attacks have either been done off-line after the attack, or have used hash-based filtering to identify large flows of data to particular sites. An example of a method of detecting large data flow is described by, for instance, Estan et al. in an article entitled "New Directions in Traffic Measurement and Accounting" in the proceedings of the Association for Computing Machinery (ACM) Special Interest Group on Management of Data (SIGMOD) 2002 conference on applications, technologies, architectures, and protocols for computer communications, ISSN:0146-4833, pp 323-336, August 2002, ACM Press, New York, N.Y., the contents of which are hereby incorporated by reference.

Large flows are, however, not necessarily a reliable indicator of DDoS activity as specific types of DDoS, such as the TCP-SYN flooding attack detailed above, do not necessary result in large traffic flows. In a TCP-SYN flooding attack, each malicious, half-open connection requires only a short message, which may be a single packet, to establish. As the SYN-ACK message remains unanswered, with no further traffic flows for that half-open connection, an effective attack can be mounted with data-flows that do not exceed the normal traffic to the site. Furthermore, merely monitoring large flows does not differentiate between DDoS activity and legitimate flash crowds that result in an unexpected surge of legitimate requests following some important event.

The methods proposed by Akella et al. in their article entitled "Detecting DDoS Attacks on ISP Networks" published in the Proceeding of the ACM SIGMOD/PODS Workshop on Management and Processing of Data Streams (MPDS) held in San Diego, Calif., June 2003, published by ACM Press, New York, N.Y., the contents of which are hereby incorporated by reference, have similar limitations as they rely on maintaining profiles of activity only for selected, popular destinations whose traffic exceeds a certain threshold.

SUMMARY OF THE INVENTION

The present invention relates to systems and methods for estimating, and continuously tracking, distinct-counts in a data-streaming fashion on large volumes of data that include both insertion and deletion events. The present invention further relates to using those estimates to obtain and update distinct-source frequencies for destination addresses that can be used to detect DDoS attacks in real-time.

In a preferred embodiment of the invention, the distinct-count estimate is accomplished in a guaranteed small foot-print by using a distinct-count sketch having two levels of hashing. The exemplary data-elements are triples, having a source address, a destination address and an insertion/deletion indicator, though the system may be applied to other, related data types. The distinct-count sketch includes a first-level hash table, which is filled by a first-level hash function operating on a combination of the source and destination address. The first-level hash function is chosen so that each of the first-level hash table buckets accumulates an exponentially decreasing number of hashed data-elements. All the data-elements in each of the first-level hash buckets are then hashed to an array of second-level-hash tables using a set of independent second-level hash functions which uniformly map data in a first-level hash bucket over a range of second-level hash buckets.

Each second-level hash bucket also has an associated count signature. The count signature includes a total-element counter and a bit-location counter for every bit of the binary representation of the combined source-destination identifier used by the hash functions. The bit-location counters count the number of occurrences of a 1 at that bit-location in the data-elements hashed into that bin. The count signature can be used to identify the singleton buckets, i.e., the second-level hash buckets having only data-elements with a common source-destination identifier. The singleton buckets are identified by the fact that, in a singleton, all the bit-location counters are either equal to zero or equal to the associated total-element count.

A distinct-sample can be found for each first-level bucket by identifying all the associated second-level singleton buckets. The distinct-count of the sample is the number of elements in this distinct-sample. This distinct-count of the sample can then be used to estimate the total distinct-count by, for instance, dividing by the probability of the first-level hash function mapping a data-element to that bucket.

To obtain a distinct-sample of a desired approximate size, the distinct-sample in the first-level hash bucket having the highest index is obtained. If this is not large enough, the distinct-sample from the bucket having the next highest index is added, until a bucket of index b is reached where the accumulated distinct-sample is reached. The total distinct count can then be estimated by obtaining the distinct-count of the accumulated distinct-sample and dividing this by the probability that data-elements map to that bucket or a higher indexed bucket, i.e. by $\frac{1}{2}^b$.

In a similar fashion, the distinct-samples in the first-level buckets can also be used to obtain a list of distinct-source frequencies of the destination addresses in an accumulated distinct-sample, and that distinct-source frequency of the sample converted to an estimate of the total distinct-source frequency by dividing the sample result by the same factor.

By monitoring the list of destination addresses, and looking for destinations whose frequencies suddenly start to grow, a DDoS attack may be detected.

In a further embodiment of the invention, the distinct count sketch is associated with an a hash table of all the singletons in each first-level bucket, a total count of singletons and a heap containing the destination addresses ordered by their distinct-source frequencies in the cumulative set of singletons in the current bucket and all the buckets having a higher index. The elements are combined to form a data structure called a tracking distinct-count sketch. The purpose of the additional structures is to avoid the need to build a distinct-sample from scratch each time there is a query requiring the k destinations having the highest distinct-source frequencies. Instead, the distinct-sample is maintained incrementally as each data-element is processed. In the preferred embodiment, the destinations having the distinct-source frequencies are also maintained and sorted incrementally, further reducing query times.

Although updating a tracking distinct-count sketch takes a longer time than updating a distinct-count sketch (the worst case maintenance increases from $O(r \log m)$ to $O(r \log^2 m)$, where m is the maximum address size and r is the number of second-level hash tables associated with each first-level hash bucket), the query time to report the k destinations having the largest distinct-source frequencies is considerably reduced (from $O(rs \log^2 m)$ to $O(k \log m)$ where s is the number of hash buckets in each second-level hash table). This reduced query time allows a tracking distinct-count sketch to be used to detect DDoS attacks on large communications networks in real-time.

These and other features of the invention will be more fully understood by references to the following drawings.

BRIEF DESCRIPTION OF THE DRAWINGS

FIG. 3 is a flow chart showing an exemplary distinct-count sketch being updated.

FIG. 4 is a flow chart showing an exemplary distinct-count sketch being queried to obtain the k destination addresses having the largest distinct-count frequency.

FIG. 5 is a flow chart showing an exemplary tracking distinct-count sketch being updated.

DETAILED DESCRIPTION

Figure 1:
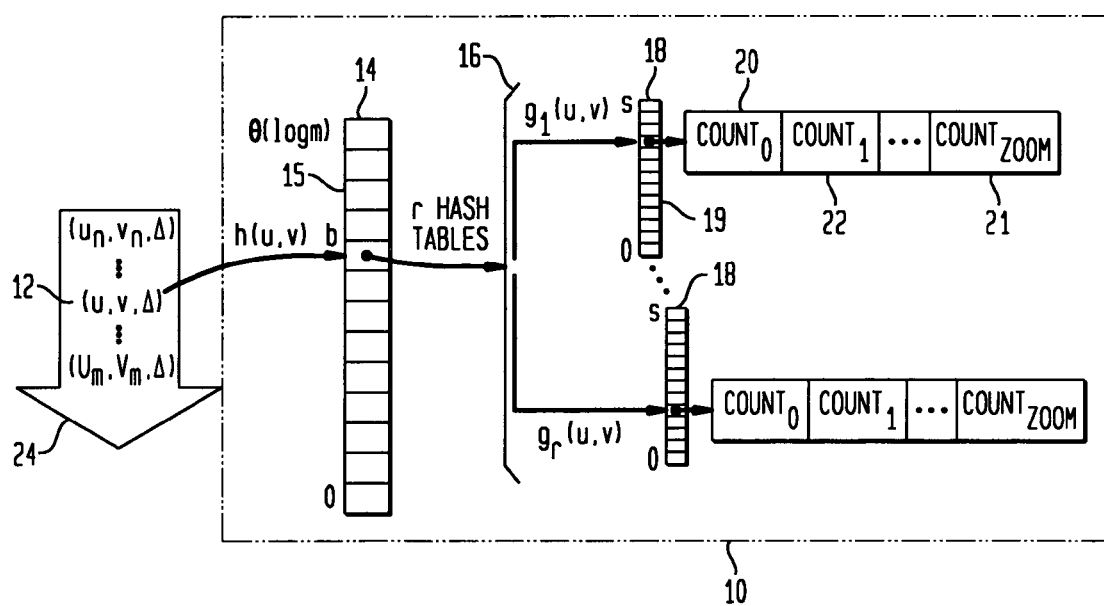
FIG. 1 is a schematic representation of an exemplary embodiment of a distinct-count sketch being updated with a data-element in a streaming fashion.

The present invention concerns methods and systems for estimating distinct-counts, i.e., counting the number of distinct domain values in a data set, and particularly for estimating distinct counts in a data-streaming fashion, i.e., by looking at each data-element only once, in a fixed order of arrival, in data streams having both insertion and deletion events.

A distinct-count provides the number of members of a set of data. Distinct-count queries, sometimes referred to as questions that can be expressed in set or frequency-independent semantics, are of importance in many fields including data-network management, business intelligence, data warehousing and data mining. The classic distinct-count query in retailing is "how many customers are buying a particular product?" To obtain this number, the total sales of the product have to be analyzed to eliminate duplication, i.e., to ensure that any customer who bought the product more than once is only counted as one distinct customer.

To answer distinct-count queries in a reasonable time from large volumes of data, it is usual to obtain distinct-count estimates using distinct-count sampling. In many of these high volume applications, responding to a distinct-count query is made more difficult because data is typically only accessible in a data-streaming fashion, i.e., each data-element can only be looked at once, in a fixed order of arrival. And then there is an even more difficult class of problems in which the data streams have both insertion and deletion events, and the analysis has to be done in real-time using a limited amount of computer memory and processing power.

Distinct-count estimates are of interest in many computing applications where large volumes of data have to be dealt with, including data warehousing, data monitoring and network data management. In these environments, distinct-count estimates are used in order to quickly, accurately and efficiently estimate quantities defined by set semantics. An exemplary problem that can be addressed using the distinct-count estimation techniques of the present invention is a distributed denial-of-service (DDoS) attack on a network, particularly a packet flooding DDoS attack, such as a well known TCP-SYN message flood attack.

What is needed to reliably detect DDoS attacks in time to avoid them is the ability to obtain a frequently updated list of the destination servers having the highest number of half-open connections attributable to distinct-source addresses, i.e., a list of destination servers that have the highest distinct-source, half-open connection frequencies. This requires continuously tracking a distinct-count of half-open connections. The distinct-count has to be accurately estimated in real-time on a large volume of data accessed in data-streaming fashion, across all destination addresses. The estimated distinct-count also has to take into account deletion events, i.e., those half-open connections which are later completed by a genuine connection.

A brute-force approach to solve this problem of explicitly maintaining the state of each possible destination in a large network is prohibitive in a large data network. Instead, by tracking approximate distinct-source frequencies, and only tracking a small number of destinations having the highest distinct-source frequencies, the present invention provides a practical way of reliably detecting DDoS in real communications networks in real-time.

Such an algorithm also makes it possible to distinguish between a DDoS attack and a surge in legitimate traffic, in which the volume of data increases, but the number of half-open connections does not rise disproportionately because the connection requests are genuine and are soon completed.

To detect DDoS in real systems, it is highly desirable that the distinct-source frequencies are obtained in a guaranteed small time, relative to the time such an attack takes to incapacitate a server, using a guaranteed small foot print, i.e., a guaranteed small amount of computer memory and processing time relative to the resources available.

FIG. 1 is a schematic view of an exemplary embodiment of a distinct-count sketch 10 being updated with a data-element 12 in a streaming fashion. The distinct count sketch comprises a first-level hash table 14, an array 16 of r second-level hash tables 18, a plurality of count signatures 21, a first-level hash function $h(u,v)$ and r second level functions $g_i(u,v)$. The first-level hash table 14 has $\Theta(\log m)$ first-level hash buckets 15, filled with exponentially decreasing probability by first-level hash function $h(u,v)$ mapping occurrences of data-element 12 from input data stream 24. Each of the r second-level hash tables 18 has s second-level hash buckets 19. Each count signature 21 is associated with a second-level hash bucket 15, and comprises a total-element counter 20, and a plurality of bit-counters 21, sufficient to count each bit of the binary representation of the combined u,v values on which all the hash functions operate.

In a preferred embodiment, data-element 12 is a triple of the form $(u,v,\Delta)$, where u and v may represent source and destination addresses of an IP packet flowing from source to destination, and $\Delta$ represents an increment or decrement event. For instance, in monitoring potential SYN-flooding attacks, the attempt to originate a TCP connection between client u and server v may be represented as data-element (u, v,+1) and the corresponding ACK packet from client u to server v that completes the establishment of the legitimacy of the TCP connection may be represented as data-element (u, v,−1).

The data-elements 12 in a packet switched network may by obtained from a flow update stream 24 by, for instance, using the Netflow™ v9 network monitoring technology supplied by Cisco Systems, Inc. of San Jose, Calif. Each data-element 12 obtained in this manner is mapped to a bucket in the the first-level hash table 14 using the first-level hash function h, which operates on the source and destination addresses u and v. This may be done by, for instance, using the concatenated address pair as the value to hash. Assuming that each IP address takes a value in the integer domain $[m]=\{0, \ldots m-1\}$, an address pair (u,v) takes values in the integer domain $[m^2]$. First-level hash function $h(u,v)$ is function chosen randomly from the set of functions having the property of mapping the address pair domain $[m^2]$ onto the $\Theta(\log m)$ hash buckets having the logarithmic range $b=\{0 \ldots \Theta(\log m)\}$ with exponentially decreasing probability, i.e.

$h:[m^2]\rightarrow\{0, \ldots \Theta(\log m)\}$,
with $\Pr[h(x)=b]=\frac{1}{2}^{b+1}$ for any $x\epsilon[m^2]$.

The probability of an address pair being mapped to the first-level hash bucket having index 0 is, therefore, ½, the probability of an address pair being mapped to the first-level hash bucket having index 1 is ¼ and so on.

After hashing a sufficiently large sample of data-elements 12, each first-level hash bucket 14 contains an exponentially decreasing number of date-elements 12, representing a sample of address-destination pairs contained in the data stream 24, with the sample size in each hash bucket being exponentially inverse to the bucket index b.

For each first-level hash table 14 bucket, there is an array of second-level hash tables 18. All the data-elements hashed to a hash bucket having index b in the first-level hash table 16 are then hashed to the r second-level hash buckets 18 by the r randomizing second level hash functions $g_i(u,v)$.

In a preferred embodiment of the present invention, the same set of second level functions $g_i(u,v)$ are used for all the bins of the first level hash table 14. The r second-level functions $g_i(u,v)$ each map the data-elements 12 having domain $[m^2]$ uniformly, but randomly, onto the [s] bins of each of the second-level hash tables, i.e., $g_i:[m^2]\rightarrow\{1, \ldots s\}$ with a uniform random probability that any x that is a member of the source-destination pair domain $[m^2]$ is mapped to any particular second-level hash bin 18.

In a preferred embodiment, the r second-level functions $g_i(u,v)$ are assumed to be mutually independent, i.e., they are defined using independently-chosen random seeds. The number r and the size s of the second-level hash tables are fixed based on factors discussed later. Each bucket of each second-level hash table 18 contains and maintains a count signature 21 of the data-elements 12 that are mapped to that bucket.

The count signature 21 has two elements: the total-element counter 20 that tracks the net total number of data-elements 12 that are mapped to that bucket, and 2 log m bit-location counters 22, each of which tracks the net total number of data-elements 12 that are mapped to that bucket that have a value 1 at that bit-location in the binary representation of the IP address pair u and v.

In a preferred embodiment, the IP address pair u and v are concatenated to a binary number in the domain $[m^2]$, so that each bit-location counter 22 of size $\Theta(\log n)$ tracks the net total number of source-destination pairs $(u,v) \epsilon [m^2]$ with $BIT_j(u,v)=1$ that map into the bucket, where $BIT_j(u,v)$ denotes the value of the $j^{th}$ bit in the binary representation of the (u,v) source-destination pair.

The count signature 21 is used to identify second-level hash table 18 buckets in which only data-elements 12 having a single distinct source-destination address (u,v) have accumulated For each second-level hash bucket 19, this is done by comparing each of the bit-location counters 22 with the corresponding total-element count 20. Only those second-level hash buckets 19 in which all the bit-location counters 22 are either equal to zero or to the total-element counter 20, contain only data-elements 12 having a single distinct source-destination address (u,v), i.e., there have been no data collisions in that second-level hash bucket 19. The second-level hash buckets 19 containing only data-elements 12 having a distinct source-destination address (u,v) are termed "singletons".

The distinct-count sketch 10 can be used to accurately estimate the number of distinct count events in a data stream 24 because each successive bucket of the first-level hash table 14 has an exponentially smaller number of data-elements 12, and therefore there is a corresponding smaller chance that a data-element 12 will collide in the second-level hash tables 18 associated with the higher indexed first-level hash table buckets.

A target distinct-sample size $\Theta(s)$ can be obtained by selecting to have s second-level hash buckets 19 in each the second-level hash tables 18. Even if the number of data elements hashed to a first-level bucket 15 is of the order of s, the second-level randomization of the data-elements 12 across r second-level hash tables, each having s second-level buckets 19, means that each distinct data-element 12 appears as a singleton in some second-level bucket 19 with a high probability, and therefore is highly likely to be counted.

FIG. 3 is a flow chart showing an exemplary distinct-count sketch being updated. In step 40, a data-element 12 is obtained. As detailed above, step 42 is a first-level hash of the data-elements 12 using a hash function that maps the data-elements 12 to indexed buckets 15 of a first-level hash table 14 so that the probability of a particular data-element 12 reaching a particular first-level hash bucket 15 is inversely and exponentially related to the index value of that bucket 19. Step 44 is a second-level hash in which an array r of hash functions $g_i$ map the data-element 12 to an array of r second-level hash tables 18, each having s buckets. Hash functions $g_i$ map with uniform probability and are mutually independent. In step 46 the total-element counters associated with the second-level hash buckets to which the data-element 12 is hashed, are either incremented or decremented, depending on whether the data-element represents an increment or decrement event. In step 48 the bit-element counters associated with the second-level hash buckets to which the data-element 12 is hashed, are either incremented or decremented, depending on whether the data-element represents an increment or decrement event, and whether the binary representation of the value the hash functions are operating on is a 1 or a 0.

FIG. 4 is a flow chart showing an exemplary distinct-count sketch being queried to obtain the k destination address having the largest distinct-count frequencies. In step 50, the first-level hash table 14 is examined to obtain a cumulative distinct-sample of a required size.

The required sample size s is $\Theta((U \log((n+\log m)/\delta)/(f_v \epsilon^2))$, where U is the total number of distinct source-destination address pairs in the data stream, $\epsilon$ is the desired relative error and $\delta$ is the desired probabilistic confidence in the frequency estimate.

The cumulative distinct-sample of $\Theta(s)$ is obtained by first examining the top bucket, having index $\Theta(\log m)$ and the smallest number of data-elements hashed to it. All the singletons in this bucket need to be found by examining the count signatures of all s second-level buckets 19 of all the r second-level hash tables 18, i.e., by comparing the bit-counters 22 of all the r.s count signatures 21 with their total-element count 20, as detailed above. If the number of singletons is not sufficient, this is then repeated for each first-level hash table 14 bucket until the required number of singletons has be accumulated. Once the required an accumulated distinct-sample of the desired size has been obtained, i.e. the cumulative number of singletons found in all first-level buckets 15 down to the current bucket b is $\Theta(s)$, the distinct-source frequency $f_v$ for all destinations v of the singleton sample need to be calculated in step 52 along the lines detailed below. In step 54, the distinct-source frequencies $f_v$ are sorted by size, so that in step 56, the k destinations having the largest distinct-source frequencies $f_v$ can be selected. In step 57 the k destinations having the largest estimated distinct-source frequencies $2^b f_v$ are then returned. The estimated distinct-source frequencies are found by dividing the distinct-source frequency of the cumulative sample by the probability of a data-element having been hash to a first-level bucket 15 having an index of b or higher, i.e. by $\frac{1}{2^b}$.

The distinct-count sketch is impervious to deletions in the sense that at the end of an update, the sketch that has seen both an increment event followed by a decrement event is identical to one that never saw an item that was later deleted.

The distinct-source frequency $f_v$ provides a robust metric of potential DDoS attacks, particularly of the TCP-ACK flooding attacks. By efficiently tracking the k destinations having the largest distinct-source frequencies, a basis is available for readily detecting, in real time, signs of potential DDoS activity in a network. For instance, a sudden increase in $f_v$ for a particular destination over a base-line value of $f_v$ may be an indication of a DDoS attack in progress.

Although the distinct count sketch 10 has been shown above in obtaining a list of distinct-source frequencies $f_v$, one of ordinary skill in the art will appreciate that such a method can be applied to multiple streams of data. For instance a distinct count sketch 10 may be used to obtain distinct-samples for each of a number of streams of data. The distinct-samples may then be used to evaluate set expressions relevant to the data, and the results then scaled to obtain estimated of the evaluation of those set expressions for the entire data streams.

The distinct count sketch 10 can be maintained and updated in a relatively small space and time, the space requirements being $\Theta(r s \log^2 m \log n)$ and the maintainace time per streaming flow update being $O(r \log m)$. However, querying such a structure to obtain an estimate of the top k distinct source frequency destinations v takes $O(r s \log^2 m)$ time. This is the result of having to go through the steps shown in FIG. 4, i.e., for each query, to accumulate a large enough sample. This requires starting at the top first level hash bucket and going down and accumulating all the singletons in each bucket, which requires examining the count signature 21 of all s second-level buckets 19 of all r second-level hash table 18, and takes $O(r s \log m)$ time at each level. As there are $O(\log m)$ level, the total query time is $O(r s \log^2 m)$. Once the level is reached at which the required number of singletons has been accumulated, the frequencies $f_v$ of all the destinations v have to be calculated, and then the frequencies sorted. Both these operations do not add significantly to the total query time.

This query time can be considerably reduced by creating a larger data structure, the tracking distinct count sketch, which can incrementally maintain the underlying distinct-sample and corresponding destination occurrence frequencies over the stream of flow updates. By not having to re-compute everything from the discrete-count sketch on every top k estimation request, the update efficiency of the distinct count sketch can be maintained, while the top k query time can be made considerably more efficient.

Figure 2:
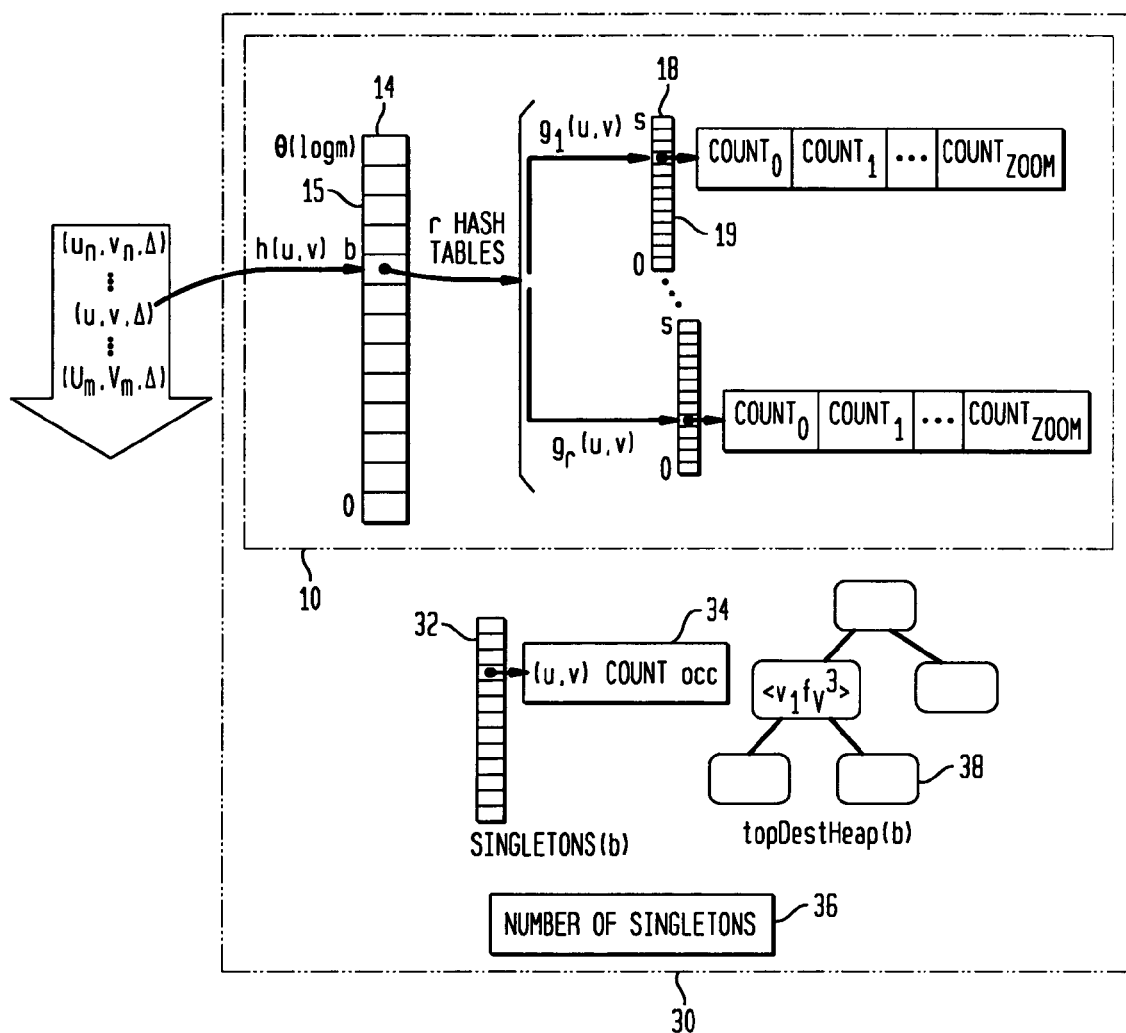
FIG. 2 is a schematic representation of an exemplary embodiment of a tracking distinct count sketch.

FIG. 2 is a schematic view of an exemplary embodiment of a tracking distinct count sketch 30, comprising a distinct count sketch 30, a singletons(b) hash table 32, a total-number-of-singletons counter 36, and a top destinations heap 38.

The singletons(b) hash table 32 contains singletons data entries 34, recording a current set of singletons in all r second-level hash tables 18 related to hash bucket b of first-level hash table 14, i.e., singletons(b) hash table 32 contains a discrete-sample of data-elements 12.

The top destinations heap 38 contains all the destinations v appearing in singletons in the cumulative distinct-sample from the current first-level bucket and all the first-level buckets having a higher index.

These additional data structures, the singletons(b) table 32, the total-number-of-singletons counter 36 and the top destinations heap 38 are updated on each streaming data update, so that top k destinations v having the largest distinct-source frequency $f_v$ can be found with a query time O(k log m).

Each entry in the singletons(b) table 32 comprises a singleton address pair (u,v) in bucket b and a count recording the number of second-level hash tables where (u,v) appears as a singleton. The singletons(b) table 32 comprises a distinct-sample of data-elements 12 hashed into a first-level hash table 14 bucket having index b. Because the maximum number of singletons in a first-level bucket is r.s, a simple way of implementing singletons(b) is as a hash-table structure with $\Theta(rs)$ entries. This allows the distinct-sample to be accessed, incremented or decremented in a constant number of instructions or steps.

The number in the total-number-of-singletons counter 36 is the size of the distinct-count sample of data-elements 12 hashed into a first-level hash table 14 bucket having index b, i.e., the distinct-count of the sample.

The maximum number of entries in the top destinations heap 38 is $r.s.\Theta(\log m)$, so the space overhead of a tracking distinct-count sketch is only a small constant factor over the space required for the basic distinct-count sketch.

FIG. 5 is a flow chart showing an exemplary tracking distinct-count sketch being updated. The algorithm for maintaining a tracking distinct count sketch over streams of flow updates begins similarly to that for a distinct count sketch. A data-element 12 obtained in step 40, is hashed to a first-level hash table 14 bucket in step 42, and then to second-level hash tables 18 in step 42. The appropriate count signatures 21 are updated appropriately in steps 46 and 48. In addition, in step 58, an evaluation is made of the singleton status of each of the r count signatures 21 affected by the update. Step 59 determines if there has been any change of singleton status. If no singleton has changed status, the next data-element 12 is processed. If there has been a change of singleton status, this change of singleton status is then used in step 60, in which the singletons(b) table 32 is updated, including singletons data entry 34 which records the frequency of singleton occurrences. Any change of singleton status is also used in step 62 to update the corresponding number of singletons counter 32. In step 64, the heaps 38 for the current bucket, and all the first-level buckets 15 having a lower index, are then adjusted to reflect any change in distinct-source frequencies $f_v$, caused by changes in singleton status.

In the case of an insertion data-element 12, a second-level hash table 14 bucket can either transition from singleton to non-singleton, if there is a data collision, or can transition from empty to singleton. Other possible transitions have no effect on the distinct-sample collected in bucket b. In each case, the count for the affected singleton address in singletons(b) table 32 is appropriately updated. In the case that the singleton is either deleted or newly inserted in singletons(b) table 32, the number of singletons counter 32 is updated, and the heaps 38 for all buckets in which the index is lower than b are updated to reflect the new frequency for the destination in the affected pair.

The procedure for a deletion event is completely symmetric to the insertion case, except that the second-level hash table 18 bucket transitions of interest are non-singleton to singleton and singleton to empty.

All the extra operations for maintaining the added distinct-sample tracking information have O(1) time complexity, with the exception of updating the heaps associated with the current first-level hash bucket 15 and all first-level hash buckets 15 having a lower index. Since there are no more than m distinct destinations and log m first-level index levels, the heap adjustments can be done in $O(\log^2 m)$ time. As the maintenance time per streaming flow update for the distinct count sketch is O(r log m), the maintenance time per streaming flow update for the tracking distinct count sketch is only $O(r \log^2 m)$.

Figure 6:
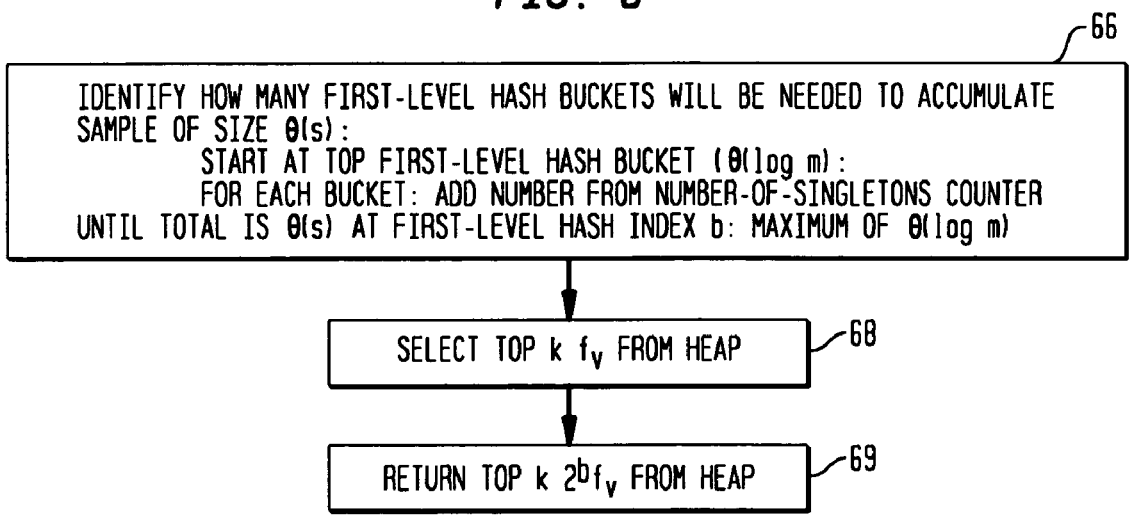
FIG. 6 is a flow chart showing an exemplary tracking distinct-count sketch being queried to obtain the k destination address having the largest distinct-count frequency.

FIG. 6 is a flow chart showing an exemplary tracking distinct-count sketch being queried to obtain the k destination addresses having the largest distinct-count frequency. Incrementally maintaining the distinct-sample information in each first-level bucket simplifies obtaining the k destinations having the largest distinct-source frequency. In step 66, the per bucket number of singletons counter 36 is used to rapidly find how many first-level hash bucket 15 are need to accumulate a large enough distinct-sample to obtain an estimation to the desired accuracy. The heap 38 in the appropriate bucket can then be used in step 68 to obtain the top k destinations. In step 69, the k destinations having the largest estimated distinct-source frequencies $2^b f_v$ can then be returned. Since each heap 38 operation for recovering the destination with the maximum occurrence frequency has a time cost of at most O(log m), recovering the top k destinations requires, at most, O(k log m) time.

As mentioned previously, the distinct-source frequency $f_v$ provides a robust metric of potential DDoS attacks, particularly of the TCP-ACK flooding attacks. By efficiently tracking the k destinations having the largest distinct-source frequencies $f_v$, a basis is available for readily detecting, in real time, signs of potential DDoS activity in a network. For instance, a sudden increase in $f_v$ for a particular destination over a base-line value of $f_v$ may be an indication of a DDoS attack in progress. An advantage of the tracking distinct count sketch is that the query time is sufficiently small that the k destinations having the largest distinct-source frequencies $f_v$ can be frequently updated. This allows DDoS attacks to be monitored in real-time even on large communications networks.

The above-described steps can be implemented using standard well-known programming techniques. The novelty of the above-described embodiment primarily lies not in the specific programming techniques but in the use of the steps described to achieve the described results. Software programming code which embodies the present invention is typically stored in permanent memory of some type, such as permanent storage of a workstation located at Bell Labs of Lucent Technologies in Murry Hill, N.J. In a client/server environment, such software programming code may be stored in memory associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of maintaining a data-structure capable of providing an approximate distinct-count of data-elements, said method comprising the steps of:
    obtaining a plurality of data-elements including a source value comprising a source IP address and a destination value comprising a destination IP address;
    using a processor for
    generating an indexed set of samples of said data-elements, each of said samples having a sample rate that is an exponentially decreasing function of the index of said sample;
    hashing said data-elements contained in one of a set of first-level hash buckets to a set of second-level hash buckets wherein hashing is performed using an address pair formed by combining said source value and said destination value;
    associating a set of count signatures with a first one of said samples, each of said count signatures comprising a total-element count and a bit-location count, wherein the associating comprises associating one of said count signatures with each of said second-level hash buckets;
    determining a set of distinct-source, half-open connection frequencies for the destination addresses; and
    determining whether any of the destinations has a frequency that increases in a manner that is indicative of a distributed denial of service attack including distinguishing between a distributed denial of service attack and a legitimate surge in traffic based on an increase in a volume of data and an associated change in half-open connections of the frequency increase.

2. The method of claim 1, comprising obtaining a distinct-count of said first sample using said count signatures, said distinct-count comprising a number indicative of data-elements contained in said sample each of which has a distinct domain value.

3. The method of claim 2, comprising identifying said second-level hash buckets containing only data-elements having a same domain value.

4. The method of claim 3, comprising identifying said second-level hash buckets in which each bit of said bit-location count is either equal to zero or equal to said total-element count.

5. The method of claim 4, wherein said data-elements further comprise an event insertion value and an event deletion value, and further comprising the step of updating a count signature by incrementing said total-element count and said bit-location count if said event has said event insertion value, and decrementing said total-element count and said bit-location count if said data-element has said event deletion value.

6. The method of claim 5, comprising calculating a distinct-count estimate for said plurality of data-elements by dividing said distinct-count by said sample rate of said first sample.

7. The method of claim 1, comprising calculating a distinct-source frequency for a first distinct destination by analyzing said count signatures, said distinct-source frequency being a total number of distinct data-elements having said destination value of said first distinct destination.

8. The method of claim 7, comprising:
    repeating said step of calculating a distinct-source frequency for a plurality of distinct-destinations; and
    ordering said plurality of distinct-destinations by size of said distinct-source frequency.

9. The method of claim 1, comprising the steps of:
    storing a distinct-sample comprising said data-elements having a same domain value in said first of said first-level hash buckets;
    analyzing said distinct sample to obtain a distinct-source frequency for a first distinct destination; and
    updating a distinct-destination heap containing a plurality of distinct-destinations ordered by size of said distinct-source frequency.

10. The method of claim 9, comprising obtaining a distinct-count of said first sample using said count signatures, said distinct-count comprising a number indicative of data-elements contained in said sample each of which has a distinct domain value; and
    storing said distinct-count.

11. The method of claim 10, comprising:
    using said stored distinct-count to locate an appropriate first-level hash bucket having a sample of a predetermined size; and
    providing said plurality of distinct-destinations ordered by size of said distinct-source frequency contained in said distinct-destination heap associated with said appropriate first-level hash bucket.

12. Computer readable instructions embodied on computer-readable storage medium, comprising;
    first computer readable instructions for obtaining a plurality of data-elements including a source value comprising a source IP address and a destination value comprising a destination IP address;
    second computer readable instructions for generating an indexed set of event samples of said data-elements, each of said samples having a sample rate that is an exponentially decreasing function of the index of said sample, wherein generating the indexed set of event samples comprises hashing said events to a first-level set of hash buckets so that each of said first-level hash buckets contains a number of events that decreases exponentially with hash index, wherein hashing is performed using an address pair formed by combining said source value and said destination value;
    third computer readable instructions for hashing said data-elements contained in one of said first-level hash buckets to a set of second-level hash buckets;
    fourth computer readable instructions for associating a set of count signatures with a first sample, each of said count signatures comprising a total event count and a bit-location count, wherein the associating comprises associating one of said count signatures with each of said second-level hash buckets;

fifth computer readable instructions for determining a set of distinct-source, half-open frequencies for the destination addresses; and sixth computer readable instructions for determining whether any of the destinations has a frequency that increases in a manner that is indicative of a distributed denial of service attack including distinguishing between a distributed denial of service attack and a legitimate surge in traffic based on an increase in a volume of data and an associated change in half-open connections of the frequency increase.

13. A computing device comprising:

a computer-readable storage medium comprising instructions for:

obtaining a plurality of data-elements including a source value comprising a source IP address and a destination value comprising a destination IP address;

generating an indexed set of event samples of said data-elements, each of said samples having a sample rate that is an exponentially decreasing function of the index of said sample, wherein generating the indexed set of event samples comprises hashing said events to a first-level set of hash buckets so that each of said first-level hash buckets contains a number of events that decreases exponentially with hash index, wherein hashing is performed using an address pair formed by combining said source value and said destination value;

hashing said data-elements contained in one of said first-level hash buckets to a set of second-level, hash buckets;

associating a set of count signatures with a first sample, each of said count signatures comprising a total event count and a bit-location count, wherein the associating comprises associating one of said count signature with each of said second-level hash buckets;

fifth computer readable instructions for determining a set of distinct-source, half-open frequencies for the destination addresses; and sixth computer readable instructions for determining whether any of the destinations has a frequency that increases in a manner that is indicative of a distributed denial of service attack including distinguishing between a distributed denial of service attack and a legitimate surge in traffic based on an increase in a volume of data and an associated change in half-open connections of the frequency increase.

* * * * *

UNITED STATES PATENT AND TRADEMARK OFFICE
CERTIFICATE OF CORRECTION

PATENT NO. : 7,669,241 B2
APPLICATION NO. : 10/954901
DATED : February 23, 2010
INVENTOR(S) : Ganguly et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Twenty-eighth Day of December, 2010

David J. Kappos
*Director of the United States Patent and Trademark Office*